(12) United States Patent
Huh et al.

(10) Patent No.: US 10,783,029 B2
(45) Date of Patent: Sep. 22, 2020

(54) DATA REPLICATION IN A STORAGE SYSTEM

(71) Applicant: Seagate Technology LLC, Cupertino, CA (US)

(72) Inventors: Stephen S. Huh, Boulder, CO (US); Ian Davies, Longmont, CO (US); Douglas William Dewey, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 209 days.

(21) Appl. No.: 15/652,038

(22) Filed: Jul. 17, 2017

(65) Prior Publication Data
US 2019/0018727 A1    Jan. 17, 2019

(51) Int. Cl.
| | |
|---|---|
| *G06F 11/07* | (2006.01) |
| *G06F 3/06* | (2006.01) |
| *G06F 11/14* | (2006.01) |
| *G06F 11/20* | (2006.01) |
| *G06F 11/30* | (2006.01) |

(52) U.S. Cl.
CPC ......... *G06F 11/0793* (2013.01); *G06F 3/065* (2013.01); *G06F 3/067* (2013.01); *G06F 3/0653* (2013.01); *G06F 3/0665* (2013.01); *G06F 11/079* (2013.01); *G06F 11/1446* (2013.01); *G06F 11/1461* (2013.01); *G06F 11/2094* (2013.01); *G06F 11/0727* (2013.01); *G06F 11/0754* (2013.01); *G06F 11/3034* (2013.01); *G06F 11/3058* (2013.01); *G06F 2201/805* (2013.01); *G06F 2201/84* (2013.01); *G06F 2201/88* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,058,047 | A * | 5/2000 | Kikuchi | G06F 11/1068 365/185.33 |
| 7,167,963 | B2 | 1/2007 | Hirakawa et al. | |
| 8,112,397 | B2 * | 2/2012 | Gilpin | G06F 11/1464 707/610 |
| 8,131,880 | B2 * | 3/2012 | Boucher | H04L 29/06 709/250 |
| 8,296,410 | B1 * | 10/2012 | Myhill | G06F 11/1464 709/223 |
| 8,583,601 | B1 * | 11/2013 | Claudatos | G06F 11/1461 707/640 |
| 8,775,549 | B1 * | 7/2014 | Taylor | H04L 67/1097 707/609 |
| 9,063,835 | B2 * | 6/2015 | Navarro | G06F 12/00 |

(Continued)

FOREIGN PATENT DOCUMENTS

WO    WO-9923562 A1 *    5/1999    .......... G06F 11/1461

*Primary Examiner* — Amine Riad
(74) *Attorney, Agent, or Firm* — Holzer Patel Drennan

(57) ABSTRACT

A storage system periodically replicates data to another storage system for data backup and protection. The storage system is configured to detect an irregularity potentially causing a fault in the storage system. Such a detected irregularity may a component failure in a storage device, a temperature change in a storage device, etc. In response to the detected irregularity, the storage system increases a replication rate of data to the backup storage system.

23 Claims, 5 Drawing Sheets

(56) References Cited

U.S. PATENT DOCUMENTS

| | | | |
|---|---|---|---|
| 9,122,643 B2 * | 9/2015 | Herz | G06F 11/1464 |
| 2005/0060618 A1 * | 3/2005 | Guha | G06F 11/008 |
| | | | 714/54 |
| 2005/0168934 A1 * | 8/2005 | Wendel | G11B 33/08 |
| | | | 361/679.36 |
| 2007/0168715 A1 * | 7/2007 | Herz | G06F 11/1441 |
| | | | 714/13 |
| 2010/0030985 A1 * | 2/2010 | Wang | G06F 11/1456 |
| | | | 711/162 |
| 2010/0287408 A1 * | 11/2010 | Kopylovitz | G06F 11/1092 |
| | | | 714/6.12 |

* cited by examiner

DATA REPLICATION IN A STORAGE SYSTEM

BACKGROUND

Data storage systems such as local servers, cloud servers, etc. utilize data replication techniques for data backup and protection. Such techniques may transmit new or modified data to a remote storage system such that the data is protected from an event affecting the local data storage system. Some storage systems utilize asynchronous replication techniques for data backup and protection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a method includes monitoring one or more operational parameters of one or more storage devices of a storage system, the one or more storage devices storing data that is replicated to a backup storage system according to a replication rate. The method further includes detecting an irregularity at a storage system and increasing the replication rate to the backup storage system responsive to detecting the irregularity at the storage system.

These and various other features and advantages will be apparent from a reading of the following Detailed Description.

BRIEF DESCRIPTIONS OF THE DRAWINGS

DETAILED DESCRIPTION

Figure 1:
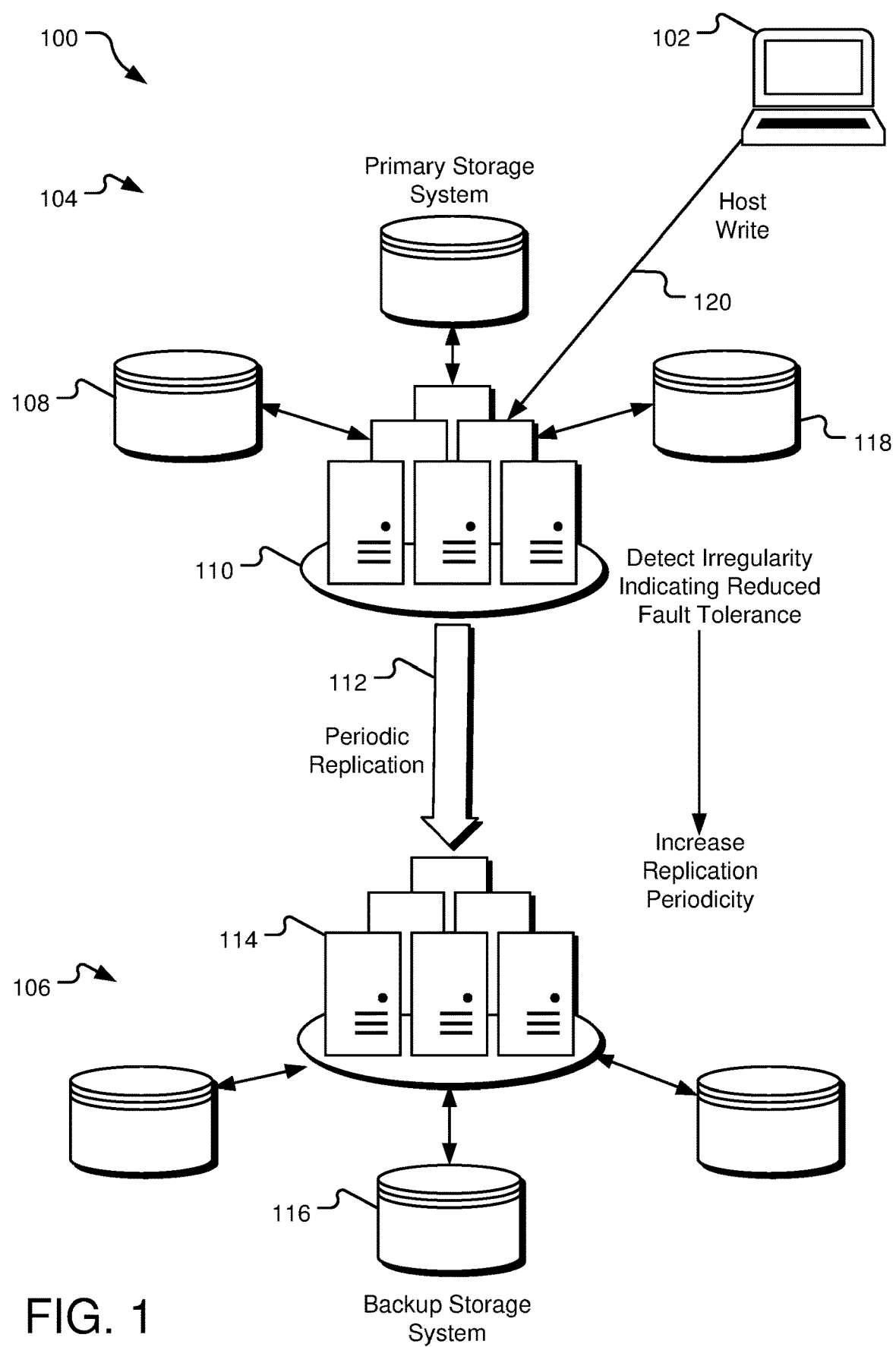
FIG. 1 illustrates an example implementation of a data storage system.

Data storage systems such as local servers, cloud servers, etc. utilize data replication techniques for data backup and protection. Such techniques may transmit new or modified data to a remote storage system such that the data is protected from an event affecting the local data storage system. Some storage systems utilize asynchronous replication techniques for data backup and protection. In systems utilizing asynchronous replication, data is transferred to the backup storage site on a periodic or scheduled basis. For example, data writes to the storage system may be batched and scheduled for backup on a periodic basis (e.g., every five minutes or every day).

Implementations described herein provided for enhanced data protection due to irregularities detected in the storage system. For example, the storage system includes a number of storage devices, such as hard disc drives (HDDs), solid state drives (SSDs), solid state hybrid drives (SSHDs), storage racks, storage platters, etc. The storage devices and the storage system may include a sensors and functionality for monitoring operational parameters and detecting irregularities. For example, the storage devices include temperature sensors that monitor operating temperatures of the storage devices and report abnormal changes in temperature to a central controller of the storage system. In response to the detected temperature change, the storage system increases the periodicity of data replication to account for a potential fault in the storage device. The storage devices are also configured to detect and report component failures such as fan failures, read and write channel data path failures, power failures, etc.

Similarly, the storage devices may monitor seek errors. If detected seek errors satisfy a threshold, then the storage devices may report the threshold satisfaction to the central controller. In response to the detected seek errors, the storage system increases the periodicity of data replication to account for a potential fault in the storage device. Similarly, the storage devices may monitor unrecovered read errors, degraded or critical operation, etc. that may compromise redundancy in the storage system.

In some example implementations, the storage devices are configured to monitor communications from one or more external devices. Such communications may include one or more feeds, such as a seismic feed, weather feed, cyber-attack feed, etc. As such, when one of the feeds reports an irregularity, such as increased seismic activity at or near the geographic location of the storage system, the device controller increases the periodicity of data replication to account for potential faults in the storage system.

Further in some example implementations, the storage system generates periodic volume snapshots that represent a state of a volume stored at the storage system. Snapshots are compared to determine differences in the data stored in the volume. The determined differences are transmitted to the backup storage system. If the storage system detects an irregularity in one or more storage devices, the snapshots are stored in a different storage device of the storage system to protect the integrity of the volume snapshots. In some implementations, the snapshots are stored in a geographically different storage device of the storage system. These and other implementations are described further with respect to the figures.

FIG. 1 illustrates an example implementation of a data storage system 100. The data storage system 100 includes a primary storage system 104 and a backup storage system 106. A host device 102, which includes user devices such as a desktop, laptop, mobile device, etc. utilizes the primary storage system 104 to store and access host data using one or more operations (e.g., a host write 120). In some implementations, the host device 102 represents a number of devices such as a number of client devices in an organization, a number of separate client devices accessing the primary storage system 104, etc. In some implementations, the host device 102 is not a user device, but rather another computing device (e.g., server) that utilizes the primary storage system 104 to store and access data. The host device 102 accesses the primary storage system using a communication network, such as a wired or wireless intranet, internet, a cellular network, etc. In some example implementations, the primary storage system 104 is a cloud based storage system that can be accessed by the host device 102 using internet. Alternatively, the primary storage system 104 is a local storage system.

The primary storage system 104 includes a server 110 and a plurality of physical storage devices such as drives 108 and 118. The plurality of physical storage devices may be implemented using storage devices such as magnetic disc drives, optical disc drives, tape drives, flash drives, solid state storage devices, hybrid drives, etc. The server 110 may be implemented with a storage controller to control access to the data on the primary storage system 104.

The backup storage system 106 includes a server 114 and a plurality of physical storage devices such as a drive 116. The plurality of physical storage devices may be implemented using storage devices such as magnetic disc drives, optical disc drives, tape drives, flash drives, solid state storage devices, hybrid drives, etc. The server 114 may be implemented with a storage controller to control access to the data on the primary storage system 104. The backup storage system 106 may be located remotely (offsite) from the primary storage system 104. It should be understood that the backup storage system 106 may be located in a different geographic location, different building, different room in a building, etc.

The primary storage system 104 and the backup storage system 106 are configured to store one or more data volumes that include one or more logical unit numbers (LUNs). Each the data volumes may be configured for a different client, customer, etc. The primary storage system 104 is configured to replicate data (e.g., volumes) stored on the primary storage system 104 to the backup storage system 106. In some example implementations, the storage system 100 utilizes asynchronous replication techniques for data backup and protection. Using asynchronous replication, new data or changed data on the primary storage system 104 is periodically transmitted to the backup storage system 106. The new or changed data may be transmitted via a communication network (e.g., wired or wireless). The replication process may occur in near real time (e.g., after each change or update of data in the primary storage system 104), or may be scheduled (e.g., every five minutes, every day). For example, write operations to the primary storage system 104 may be batched and scheduled to be transmitted to the backup storage system 106 on a periodic basis. The periodic basis (herein after "periodicity") may be determined based on a user setting, device setting, system setting, etc. For example, a user/customer may pay extra for more periodic of replications relative to a different customer that pays less for less periodic replication. The replication process may be controlled by the server 110 (e.g., a storage controller, a replication controller).

Asynchronous replication techniques may utilize volume "snapshots" to determine data deltas (changes) for replication. For example, the primary storage system 104 stores a volume A for a customer A. On a periodic basis, a snapshot of the volume A is generated. The generated snapshot represents a "state" of the volume A. When a subsequent snapshot is generated, the first snapshot and the second snapshot may be compared to determine the differences in the volume states (e.g., using a diff operation). The determined differences are transmitted to the backup storage system 106 for data replication.

The primary storage system 104 includes sensors, interface, etc. that detect and monitor irregularities that may cause a fault in the storage system or decrease fault tolerance in the storage system. For example, the storage drive 118 may include a temperature sensor that detects an abnormal increase in temperature of the storage drive 118. Such an increase in temperature may be caused by a faulty fan (which may be detecting using other functionality), an increase of the operating environment of the storage drive 118 (e.g., the storage drive 118 is located in a room with a faulty HVAC system), etc. The increase in temperature is reported to the server 110 (e.g. the replication controller). In response, the replication controller increases the periodicity of replication of data of the primary storage system 104 to account for a potential fault in the storage drive 118 due to the temperature increase of the operating environment of the storage drive 118.

Other example irregularities that may be detected include component failures, such as a fan, read/write head failure, storage medium failure (e.g., compromised disc), a path failure, etc. Some component failures, such as a fan failure, may be detected using small computer system interface (SCSI) techniques. In some example implementations, one or more of the storage devices (e.g., the storage drive 108) of the primary storage system 104 includes SCSI functionality. The devices use SCSI to report failures to the server 110 (e.g., the storage controller or replication controller).

Read/write head failures and/or storage medium failures may be detected based on a number of write errors detected above a threshold. For example, a number of write errors may indicate an increased vibration in the storage drive 108, which may include a platter of discs, a single disc, a single disc surface, etc. These write errors may be monitored by the storage drive 108. If the number of errors satisfy an error reporting condition, the server 110 is notified, and the replication rate is increased. In some example implementations, the storage devices (e.g., the storage drive 108) include an accelerometer for detecting vibration in the device and/or the operating environment. If the accelerometer detects increased vibration activity, then the accelerometer reports the vibration activity to the server 110.

In some example implementations, irregularities are detected using communications received from a device external to the storage system. For example, the primary storage system 104 may include a cloud monitoring service (e.g., in the server 110), that monitors and/or receives information from feeds. For example, the cloud monitoring service may be communicatively connected to a seismic feed of a local seismic reporting service (e.g., a United States Geological Service (USGS) feed0. If the feed indicates increased seismic activity in or near the geographic location of the primary storage system 104, then the server 110 increases the replication rate of data to the backup storage system 106. Similar feeds may be used to monitor weather (e.g., tornadic or hurricane activity), wildfires, floods, etc. In some example implementations, cyber-attacks are monitored. If a feed reports increases cyber activity, then the replication rate is increased. Other types of feed services are contemplated.

In some example implementations that use snapshots to conduct data replication, the location of the snapshots are changed based on the detected irregularities. For example, if an irregularity is detected that decreases the fault tolerance of the drive 118, then snapshots of a volume stored at the primary storage system 104 are directed to devices other than the drive 118 (e.g., to the drive 108). Accordingly, the integrity of the snapshots is maintained, and as a result, the integrity of the data of the volume is maintained.

Figure 2:
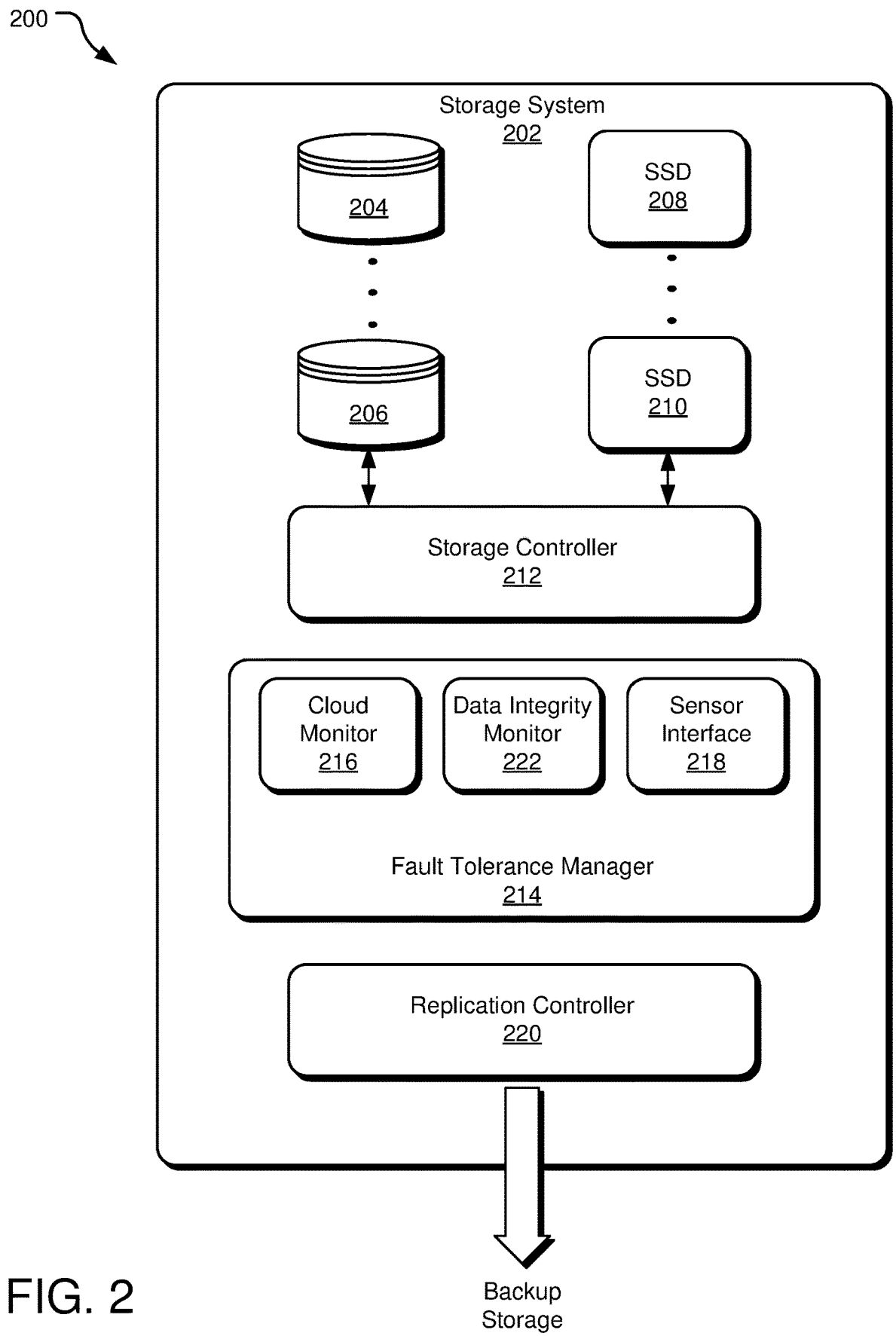
FIG. 2 illustrates an example block diagram of an implementation of a storage system.

FIG. 2 illustrates an example block diagram 200 of an implementation of a storage system 202. The storage system 202 includes one or more storage devices such as hard disc drives (HDDs) 204 and 206, solid state drives (SSDs) 208 and 210. It should be understood that the storage system 202 may include solid state hybrid drives (SSHDs), disc platters (e.g., plurality of discs), optical discs, magnetic discs, flash drives, etc. A storage controller 212, which may be embodied in processor-readable instructions executable by a processor (not shown), controls access (e.g., read/writes) to the storage devices. The storage controller 212 may further control tiering and caching decisions, logical to physical storage mapping, etc.

The storage system 202 further includes a fault tolerance manager 214. The fault tolerance manager 214 includes functionality to detect irregularities that may reduce the fault tolerance of one or more storage devices of the storage system 202. The fault tolerance manager 214 includes a sensor interface 218 that is communicatively connected to one or more sensors embedded in the storage devices (e.g., the HDD 206 and the SSD 210). The sensors include, for example, a temperature sensor that monitors the operating temperature of the storage devices. The sensor interface 218 may actively monitor the sensors in the storage devices or may receive communications from the storage devices when the sensors detect temperature changes above a threshold. The sensor interface 218 may also be connected to a small computer system interface (SCSI) of each of the storage devices. The SCSIs may detect and report component failures such as fan failures, path failures, power failures, etc. In some example implementations, the storage devices include accelerometers for detecting vibrations. It should be understood that other sensor types are contemplated.

A data integrity monitor 222 of the fault tolerance manager 214 monitors or receives reports from the storage devices (e.g., via the storage controller 212) regarding data irregularities. For example, the HDD 206 detects an abnormally amount of seek errors (e.g., read/write errors) indicating an irregularity, such as a vibration or actuator failure. These detected errors are reported to the data integrity monitor 222. In another example, the storage system (e.g., the data integrity monitory 222) detects unrecovered read errors and degraded operation (e.g., due to a non-repaired disk error) or critical operation (also due to a disk failure, but any subsequent disk failure will lose data) in a storage device of the storage system 202. Detected read errors or degraded or critical operations may cause degradation in redundancy. As such, replication rate is increased.

A cloud monitor 216 monitors feeds and/or reports from cloud services such as a U.S. Geological Survey (USGS) seismic activity feed. The feed may indicate seismic activity at or near the geographic location of the storage system 202. Another example feed monitored by the cloud monitor 216 includes a weather feed for monitoring tornadic activity, hurricanes, high winds, in the geographic area of the storage system 202, which may indicate an irregularity that could reduce the fault tolerance in the one or more storage devices of the storage system.

Any irregularities detected or monitored by the fault tolerance manager 214 (e.g., via the cloud monitor 216, the data integrity monitor 222 or the sensor interface 218) may be reported to a replication controller 220 of the storage system. The replication controller 220 controls the replication rate of data being replicated (e.g., backed-up) to a remote storage system. The replication rate may initially be based on a user setting, device setting, data writes, etc. In response to receiving an irregularity report from the fault tolerance manager 214, the replication controller 220 increases the replication rate. Such an increase may include an increase in periodicity of snapshots of one or more data volumes stored in the storage system 202.

Figure 3:
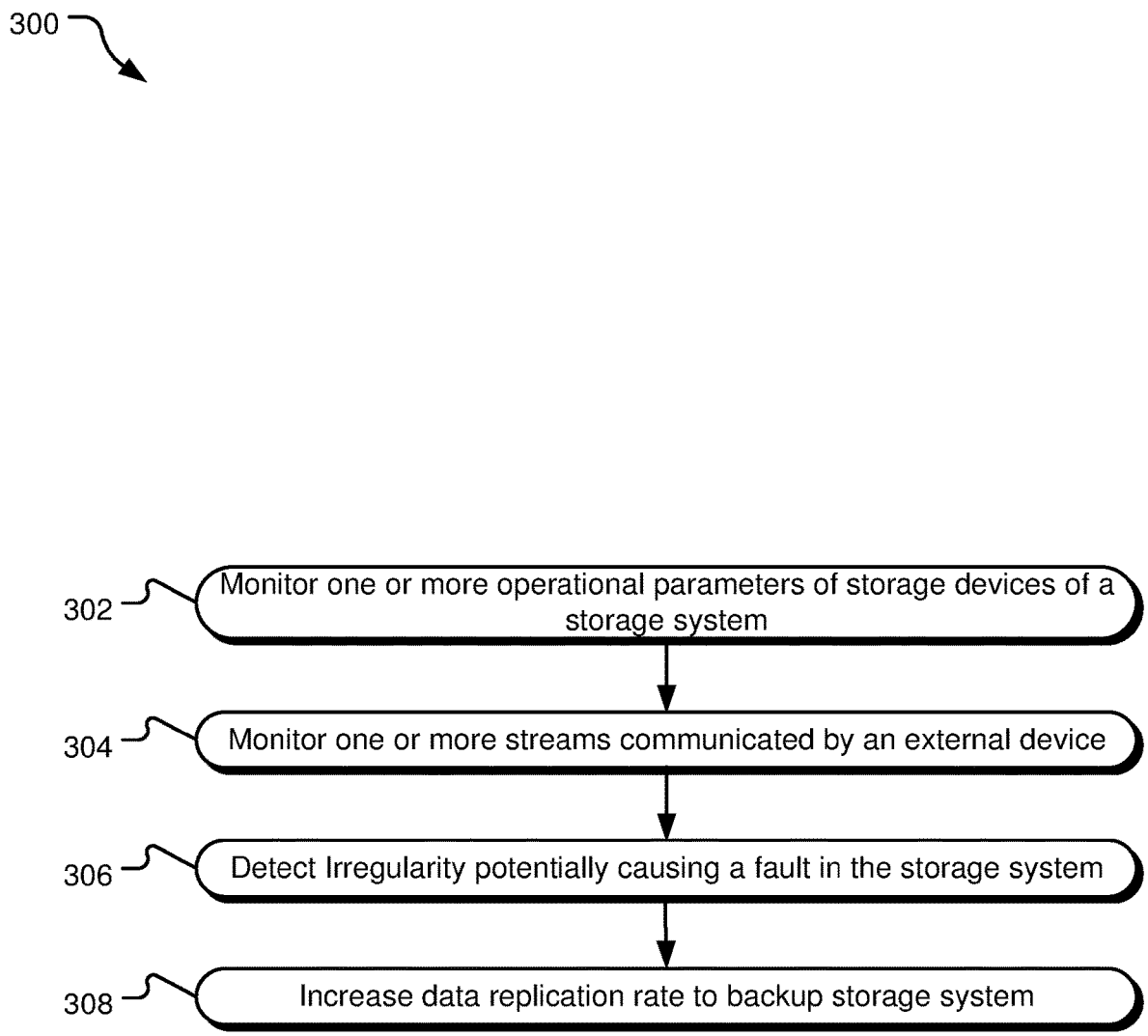
FIG. 3 illustrates example operations for increasing a data replication rate in a storage system due to a detected irregularity.

FIG. 3 illustrates example operations 300 for increasing a data replication rate in a storage system due to a detected irregularity. A monitoring operation 302 monitors one or more operational parameters of storage devices of a storage system. The one or more devices may include magnetic disc drives, optical disc drives, tape drives, flash drives, solid state storage devices, hybrid drives, storage racks, storage platters, storage chassis, etc. The operational parameters may include temperature, component failures, seek errors, vibration, unrecovered read errors, degraded or critical operation, etc. A second monitoring operation 304 monitors one or more streams communicated by an external device. The streams may include seismic streams, weather streams, social media streams, cyber-attack streams, etc. A detecting operation 306 detects an irregularity that potentially causes a fault in the storage system. In other words, the irregularity indicates a reduced fault tolerance in the storage system and/or one or more storage devices of the storage system. In response to the detecting operation 306, an increasing operation 308 increases a data replication rate to a backup storage system.

Figure 4:
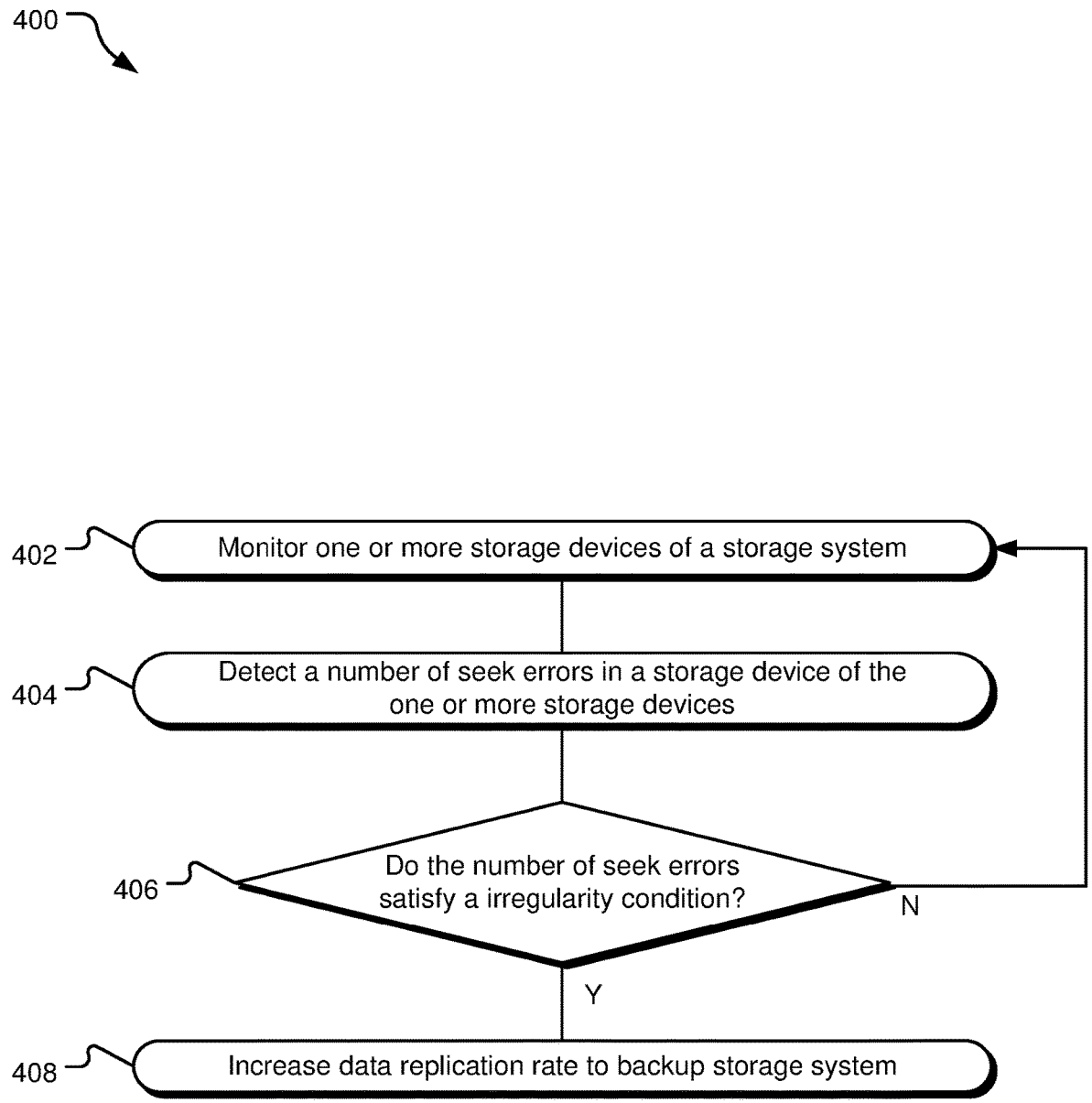
FIG. 4 illustrates example operations for increasing a data replication rate in a storage system due to a detected irregularity.

FIG. 4 illustrates example operations 400 for increasing a data replication rate in a storage system due to a detected irregularity. A monitoring operation 402 monitors one or more storage devices of a storage system. The one or more devices may include magnetic disc drives, optical disc drives, tape drives, flash drives, solid state storage devices, hybrid drives, storage racks, storage platters, storage chassis, etc. A detecting operation 404 detects a number of seek errors in a storage device of the one or more storage devices. The seek errors may be monitored at a device level, a system level, and/or a subset of devices may be monitored. A determining operation 406 determines whether the number of seek errors satisfy an irregularity condition. The irregularity may be based on device test parameters, normal operating parameters, etc. If the number of seek errors satisfy the irregularity condition, an increasing operation 408 increases a data replication rate to the backup storage system. If the number of seek errors do not satisfy the irregularity condition, the process returns to the monitoring operation 402, which monitors the one or more storage device of the storage system.

Figure 5:
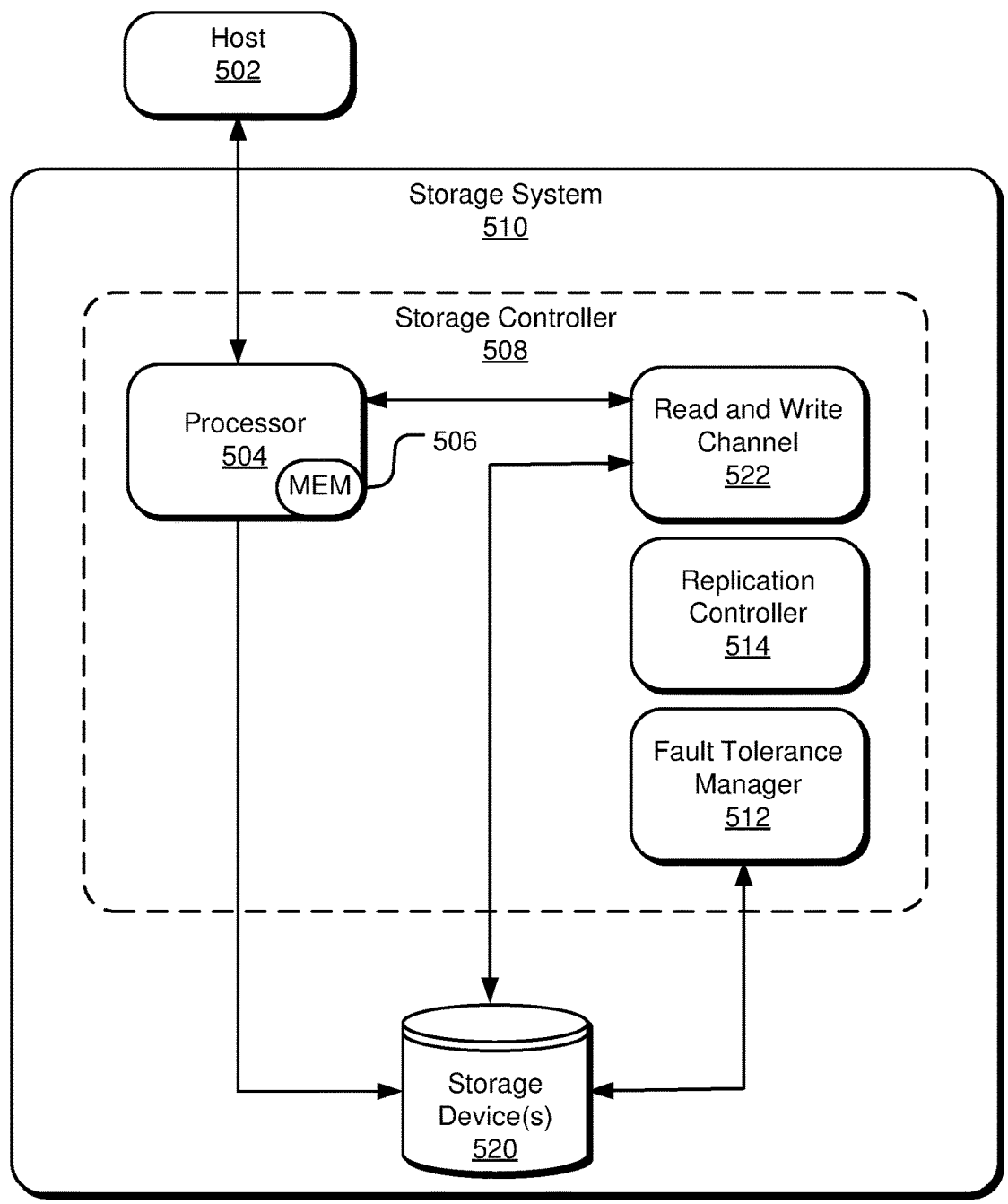
FIG. 5 illustrates an example schematic of a storage controller of a storage system.

FIG. 5 illustrates an example schematic 500 of a storage controller 508 of a storage system 510. Specifically, FIG. 5 shows one or more functional circuits that are resident on a printed circuit board used to control the operation of the storage system 510. The storage controller 508 may be operably and communicatively connected to a host computer 502. Control communication paths are provided between the host computer 502 and a processor 504. Control communication paths are provided between the processor 504 and the storage devices 520 via a number of read/write channels (e.g., read and write channel 522). The processor 504 generally provides top-level communication and control for the storage controller 508 in conjunction with processor-readable instructions for the processor 504 encoded in processor-readable storage media 506. The processor-readable instructions comprise instructions for controlling writing to and reading from storage devices 520. The processor-readable instructions further include instructions for irregularity detection and increased replication periodicity for the storage system 510, storage device 520 virtualizations, etc.

The term "processor-readable storage media" includes but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor-readable communication signals may embody processor-readable instructions, data structures, program modules or other data resident in a modulated data signal, such as a carrier wave or other signal transport mechanism.

The storage controller 508 controls storage of data on the storage devices 520 such as HDDs, SSD, SSHDs, flash drives, etc. Each of the storage devices may include spindle motor control circuits for controlling rotation of media (e.g., discs) and servo circuits for moving actuators between data tracks of storage media of the storage devices 520.

Other configurations of storage controller 508 are contemplated. For example, storage controller 508 may include one or more of an interface circuitry, a buffer, a disc drive, associated device peripheral hardware, an encryption unit, a compression unit, a replication controller, etc. The storage controller 508 includes a replication controller 514 that controls replication and periodicity of such replication to a remote device or system (not shown). The storage controller 508 further includes a fault tolerance manager 512 that monitors irregularities in the storage devices 520 and one or more feeds from external devices (not shown) to detect irregularities and report to the replication controller 514. The replication controller 514 and the fault tolerance manager 512 may be embodied in processor-readable instructions stored in the memory 506 (a processor-readable storage media) or another processor-readable memory.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
monitoring seek errors on one or more storage devices of a storage system, the one or more storage devices storing data that is replicated to a first backup storage system according to a replication rate;
detecting an irregularity at the storage system based on a number of the seek errors satisfying a threshold; and
increasing the replication rate to the first backup storage system responsive to detecting the irregularity at the storage system.

2. The method of claim 1 wherein the irregularity is further based on a temperature change relative to a monitored operating temperature, the temperature change affecting at least one of the one or more storage devices.

3. The method of claim 1 wherein the irregularity is further based on a component failure in at least one of the one or more storage devices, the component failure detected using a small computer system interface (SCSI).

4. The method of claim 1 wherein the irregularity is further based on a detected vibration in at least one of the one or more storage devices.

5. The method of claim 1 further comprising:
monitoring communications from one or more external devices, the irregularity is further based on a monitored communication from the one or more external devices, the communication indicating the irregularity potentially causing the fault in the storage system.

6. The method of claim 1 wherein the data is replicated using an asynchronous replication technique based on periodic volume snapshots and wherein increasing the replication rate further comprises increasing a periodicity of the periodic volume snapshots.

7. The method of claim 1 wherein the data is replicated using an asynchronous replication technique based on periodic volume snapshots and the irregularity is detected in at least one storage device of the one or more storage devices, the method further comprising:
storing the periodic volume snapshots at a storage device different from the at least one storage device where the irregularity is detected.

8. One or more non-transitory processor-readable storage media encoding processor-executable instructions for executing on a computer system a computer process, the computer process comprising:
monitoring seek errors on one or more storage devices of a storage system, the one or more storage devices storing data that is replicated to a first backup storage system according to a replication rate;

detecting an irregularity at the storage system based on a number of the seek errors satisfying a threshold; and
increasing the replication rate to the first backup storage system responsive to detecting the irregularity at the storage system.

9. The one or more non-transitory processor-readable storage media of claim 8 wherein the irregularity is further based on a temperature change relative to a monitored operating temperature, the temperature change affecting at least one of the one or more storage devices.

10. The one or more non-transitory processor-readable storage media of claim 8 wherein the irregularity is further based on a component failure in at least one of the one or more storage devices, the component failure detected using a small computer system interface (SCSI).

11. The one or more non-transitory processor-readable storage media of claim 8 wherein the irregularity is further based on a detected vibration in at least one of the one or more storage devices.

12. The one or more non-transitory processor-readable storage media of claim 8 further comprising:
monitoring communications from one or more external devices, the irregularity is further based on a monitored communication from the one or more external devices, the communication indicating the irregularity potentially causing the fault in the storage system.

13. The one or more non-transitory processor-readable storage media of claim 8 wherein the data is replicated using an asynchronous replication technique based on periodic volume snapshots, wherein increasing the replication rate further comprises increasing a periodicity of the periodic volume snapshots.

14. The one or more non-transitory processor-readable storage media of claim 8 wherein the data is replicated using an asynchronous replication technique based on periodic volume snapshots and the irregularity is detected in at least one storage device of the one or more storage devices, the process further comprising:
storing the periodic volume snapshots at a storage device different from the at least one storage device where the irregularity is detected.

15. A storage system comprising:
one or more storage devices storing data, the data being replicated to a first backup storage system according to a replication rate;
a fault tolerance manager configured to monitor seek errors on the storage devices and detect an irregularity in the storage system based on a number of the seek errors satisfying a threshold; and
a replication controller configured to increase the replication rate to the first backup storage system responsive to detecting the irregularity at the storage system.

16. The storage system of claim 15 wherein the fault tolerance manager includes a sensor interface for monitoring one or more sensors of the one or more storage devices, the sensor interface communicatively connected to a temperature sensor of the one or more storage devices, the irregularity further based on a temperature change relative to an operating temperature, the temperature change affecting at least one of the one or more storage devices.

17. The storage system of claim 15 wherein the fault tolerance manager includes a sensor interface for monitoring one or more sensors of the one or more storage devices, the sensor interface communicatively connected to a small computer system interface (SCSI) of the one or more storage devices, the irregularity is further based on a component failure in at least one of the one or more storage devices.

18. The storage system of claim 15 wherein the fault tolerance manager includes a data integrity monitor for monitoring the seek errors in the one or more storage devices, the irregularity further based on a detected vibration in at least one of the one or more storage devices.

19. The storage system of claim 15 wherein the fault tolerance manager includes a cloud monitor for monitoring communications by a device external to the storage system, the external device transmitting a communication indicating the irregularity potentially causing the fault in the storage system.

20. The storage device of claim 15 wherein the data is replicated using an asynchronous replication technique based on periodic volume snapshots and the irregularity is detected in at least one storage device of the one or more storage devices, the replication controller further configured to store the periodic volume snapshots at a storage device different from the at least one storage device where the irregularity is detected.

21. The method of claim 1, wherein the threshold is a threshold quantity of seek errors.

22. The method of claim 1, wherein satisfying the threshold occurs over a life of the storage system.

23. The method of claim 1, wherein the seek errors are monitored across all the storage devices of the storage system.

* * * * *